April 12, 1938. L. STATHAM 2,113,749
METHOD AND APPARATUS FOR COMPARING ELECTRICAL TRANSIENTS
Filed Dec. 13, 1935 6 Sheets-Sheet 1

Louis Statham Inventor
By P. L. Young Attorney

Louis Statham Inventor
By ... Young Attorney

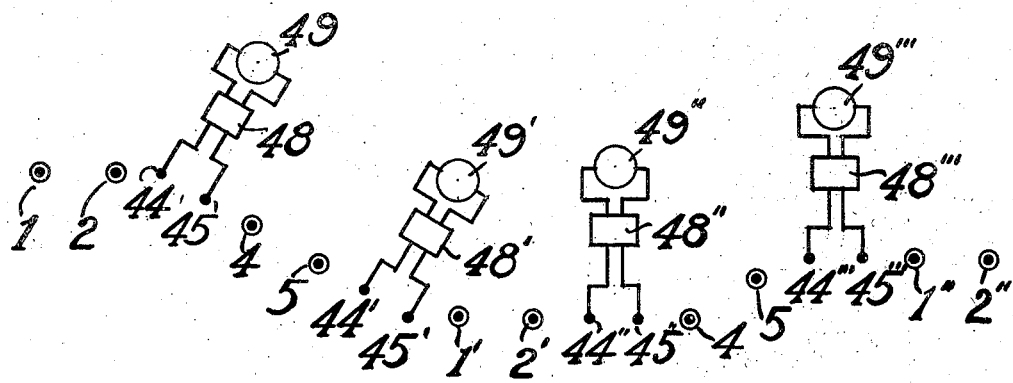
Fig.-6
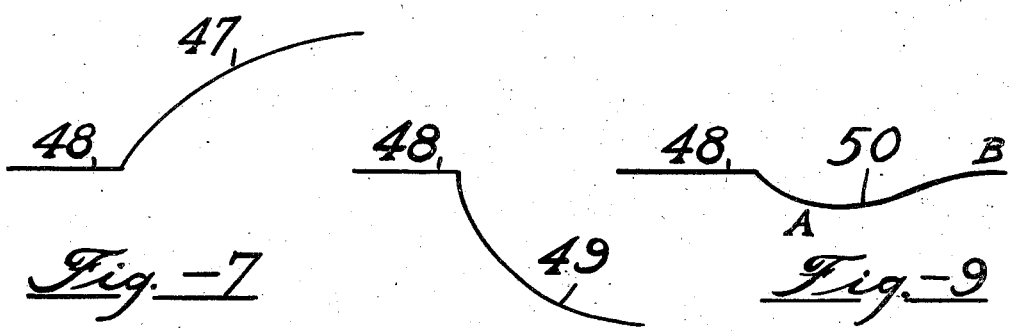
Fig.-7
Fig.-8
Fig.-9
Louis Statham Inventor
By P. L. Young Attorney Louis Statham Inventor
By P. L. Young Attorney Patented Apr. 12, 1938

2,113,749

UNITED STATES PATENT OFFICE 2,113,749

METHOD AND APPARATUS FOR COMPARING ELECTRICAL TRANSIENTS

Louis Statham, Houston, Tex., assignor to Standard Oil Development Company, a corporation of Delaware Application December 13, 1935, Serial No. 54,179

20 Claims. (Cl. 175—182)

This invention relates to the comparison of electrical transients. More particularly it relates to improvements in methods and apparatus for geophysical prospecting by means of earth electrical transients.

In geophysical prospecting by means of earth electrical currents as previously carried out two methods of approach have been employed. In one method a steady current has been passed through the earth and measurements have been made of the steady potentials at different points, both by inductive and conductive means. In the other method the instantaneous potential at different points due to a suddenly applied current has been recorded and the time constants of the transients studied to obtain determinations of the conductivity of the earth. The latter method is fundamentally superior to the method involving measurements of the steady potentials because a greater depth can be reached by the same electrode spacing. This latter method has been described in U. S. Patent No. 1,911,137 granted May 23, 1933, to Ludwig W. Blau, entitled "Method and apparatus for geophysical exploration". The field procedure of the method of this patent has been described in detail by J. C. Karcher and Eugene McDermott in the "Bulletin of the American Association of Petroleum Geologists", volume 19 No. 1 (January 1935) page 64. The use of the method involves the recording, with time marks, of the transient.

The transient obtained by this method is then compared with other transients taken in a similar manner at other stations. The usual method of evaluating the time of the transient has been to measure the time required for the potential to reach a predetermined fraction of its steady value. The time thus measured has then been used to calculate the conductivity of the earth at that station, this time being a function of the conductivity and of the distance between the current electrodes and the potential electrodes. Refined methods of timing have been required, as the time involved is very short (usually less than 1/100th of a second). It has been necessary also to record the transient with very great amplitude in order that small variations could be detected. If a variation of 1/10th of one percent were to appear on the record as a displacement of one millimeter in the position of the trace of the transient, the amplitude of the recorded transient must be 100 centimeters. A record of this nature with such an amplitude has been difficult to obtain.

It is an object of this invention to eliminate the necessity of making time measurements and of recording such large amplitude transients, and to accomplish at the same time an accurate comparison of the transient at one station with the transient at another station.

Other objects will be apparent from the specification, taken in connection with the accompanying drawings in which latter Fig. 1 is a transverse sectional view through the earth showing in diagrammatic representation a preferred form of apparatus for carrying out the invention.

Fig. 6 is a top plan view showing the arrangement of electrodes of Fig. 5 disposed along a roadway.

Fig. 7 is a record of the potential difference between the potential electrodes due to the current between the first set of current electrodes.

Fig. 8 is a record representing the potential difference between the potential electrodes due to the second set of electrodes.

Fig. 9 is a record of the sum of these two potential differences.

Figure 1:
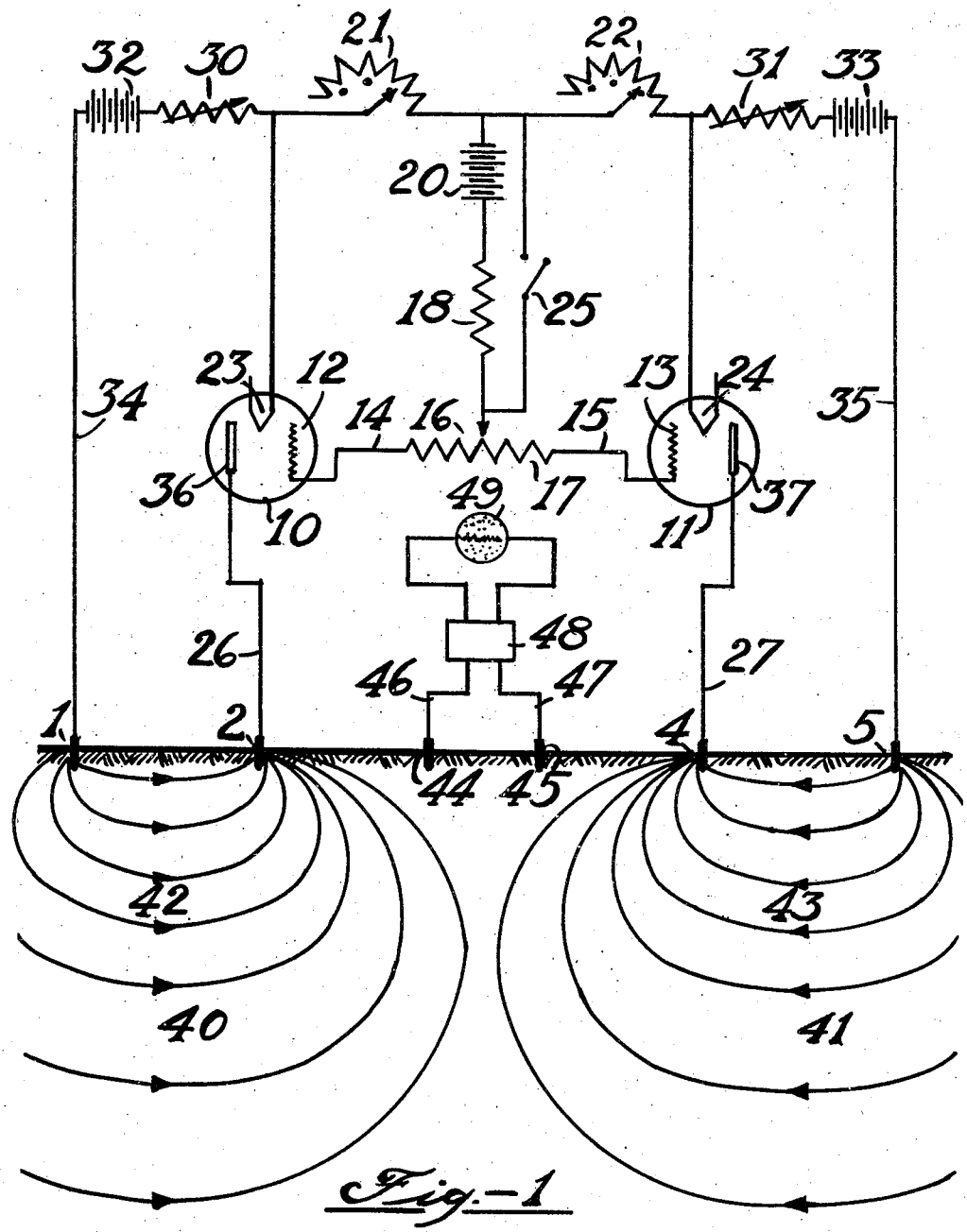
Figure 2:
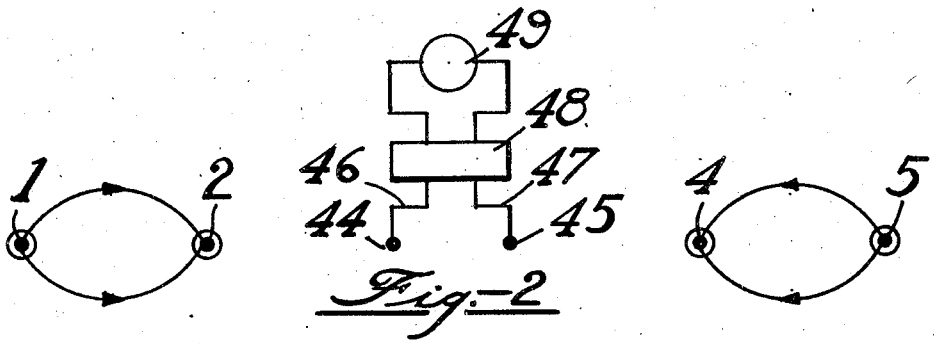
Fig. 2 is a top plan view showing the arrangement of electrodes in Fig. 1.

Referring particularly to Figs. 1 and 2 of the drawings, reference numerals 1 and 2 designate a pair of current stakes or electrodes driven into the ground at suitable positions. A second pair of current electrodes 4 and 5 are disposed in the ground in alignment longitudinally with the first pair of electrodes. The two pairs of electrodes are spaced from each other any suitable distance such as 2000 feet. The distance between the electrodes 1 and 2 may be any suitable distance such as one mile. Preferably the distance between the electrodes 4 and 5 is made the same as the distance between the electrodes 1 and 2.

Means are provided for simultaneously passing an electric current through the earth between electrodes 1 and 2 and between electrodes 4 and 5, the means comprising thyratron tubes 10 and 11, which may be of the screen grid type; the plates 36 and 37 of the tubes are connected through lines 26 and 27 to current stakes 2 and 4. The grids 12 and 13 of the tubes are connected together through lines 14 and 15 and resistances 16 and 17. The resistances 16 and 17 are connected through resistance 18, battery 20 and resistances 21 and 22 to the cathodes 23 and 24 of the thyratron tubes. The resistance 18 and battery 20 are shunted by a firing switch 25. The cathodes of the tubes are also connected through rheostats 30 and 31 and batteries 32 and 33 through lines 34 and 35 to the current stakes 1 and 5. The battery 20 is of such value that no current is permitted to flow through the thyratron tubes from plate to cathode so long as the firing switch 25 is open. Upon closing the firing switch 25 current is caused to flow from plate to cathode of the two thyratrons 10 and 11 simultaneously. While the arrangement of thyratron tubes has been illustrated as a preferred means for closing the circuits between the two sets of electrodes simultaneously it will be understood that other mechanisms for this purpose such as mechanical means can be used and some of the advantages of the invention will be retained.

A few lines of current flow between electrodes 1 and 2 are designated by 40 and lines of current flow between lines 4 and 5 are designated by 41. The directions of flow of currents are shown by arrows 42 and 43 and are preferably in opposite directions as shown.

Upon closing the firing switch 25 the lines of current flow 40 and 41 are propagated downward and outward beginning with a concentration of current near the surface and progressing with a broad distribution of the current lines through a large volume. This propagation of current lines gives rise to a transient potential at all points in said volume of the earth.

In a preferred form of the invention the thyratron tubes 10 and 11 are of the screen grid type in order that the resistances 16, 17, 18, 21, and 22 which couple the two independent current circuits may be large, thereby eliminating the possibility of interchange of energy between the two current circuits, as it is not desired that current flow between electrodes 2 and 5 or between electrodes 1 and 4. By way of example, the resistances 16, 17, 18, 21, and 22 may be 100,000 ohms each and the battery 20 may be 22½ volts. The rheostats 30 and 31 may be 100 ohms each and the batteries 32 and 33 may be of 100 volts each.

The electrodes 1, 2, 4, and 5 may consist of a short section of copper pipe immersed in a shallow hole containing salt water. The potential electrodes 44 and 45 may be ordinary brass rods driven into the ground to a depth of about one foot.

Means are provided for measuring the difference between the transient potentials at two selected points in the earth. The means comprises spaced potential electrodes 44 and 45 which are disposed between the two sets of current electrodes and in substantial alignment therewith. The potential electrodes 44 and 45 are connected by lines 46 and 47 to a suitable amplifier 48 and an oscillograph 49. Preferably the oscillograph is a cathode ray oscillograph.

When the switch 25 is closed, currents 40 and 41 are caused to flow simultaneously through the earth producing at the potential stakes 44 and 45 a difference of potential which is equal to the sum of the potential differences induced by current 40 and that induced by current 41. The steady state potential difference induced between 44 and 45 by current 40 is made equal and opposite to that induced by current 41 by adjusting rheostats 30 and 31. When the steady state values of the potential differences are equal and opposite, anything which is recorded must be the difference between the transients. Preferably the record is produced on a cathode ray oscillograph screen.

In a preferred form of the invention the cathode ray oscillograph which is used is of the 4 plate electro-static deflection type whose horizontal deflection plates are connected to a linear sweep circuit and whose vertical deflection plates are connected to the voltage to be recorded and which can be used to impress upon the fluorescent screen any transient phenomena which it may be desired to study by visual observation without the necessity of employing photography.

The potentials involved are illustrated in Figs. 7, 8, and 9. In Fig. 7 the curved line 47 leading from a base line 48 represents the potential difference between 44 and 45 induced by the current 40 in the absence of the current 41. In Fig. 8 the curved line 49 represents the potential difference between 44 and 45 induced by current 41 in the absence of current 40. The two potential differences are equal in amplitude and opposite in phase as clearly shown by Figs. 7 and 8 due to the opposition of the currents 40 and 41 as shown by the current direction arrows 42 and 43. The potential difference represented by Fig. 8 is assumed to rise more rapidly than that represented by Fig. 7. The sum of the two potential differences is shown in Fig. 9 in which the curved line 50 represents the potential difference between potential electrodes 44 and 45 induced by the application of both currents 40 and 41 simultaneously, and, referring to Figs. 7 and 8, it is the graphical sum of these two transients. The potential as shown in Fig. 9 has a negative value at A due to the fact that the rate of increase of potential difference as shown in Fig. 8 is greater than that shown in Fig. 7 and the potential difference as shown in Fig. 9 meets its equilibrium position at B due to the fact that ultimate amplitudes of the potential differences as shown in Figs. 7 and 8 are equal and opposite. We then move 44 or 45 or both closer to electrode 2 thereby increasing the rate of rise of potential difference due to current 40 or decreasing the rate of rise of potential difference due to current 41. The steady state amplitudes of the potential differences induced by currents 40 and 41 are then again made equal and opposite by adjusting rheostats 30 and 31 and another observation is made. When 44 and 45 have finally been adjusted so that the transients are equal and opposite the record on the oscillograph screen will appear as a straight line, and knowing that the time constants of the transients involve both the distances 2 to 44 and 4 to 45 and the conductivities of the earth through which currents 40 and 41 flow, we may readily calculate the ratio of effective conductivity of the earth through which current 40 flows to that through which current 41 flows.

As the spacing between 44 and 45 is very great the potential at 45 is not influenced appreciably by earth current 40, nor is the potential at 44 influenced appreciably by the earth current 41. The potential difference between 44 and 45 as recorded by the recording apparatus, will then be zero when the potential at 44 is equal to the potential at 45. The setup 1, 2 and 44 may then be far removed from the setup 5, 4 and 45 and it is not necessary in this case that the two setups lie in the same straight line.

Figure 14:
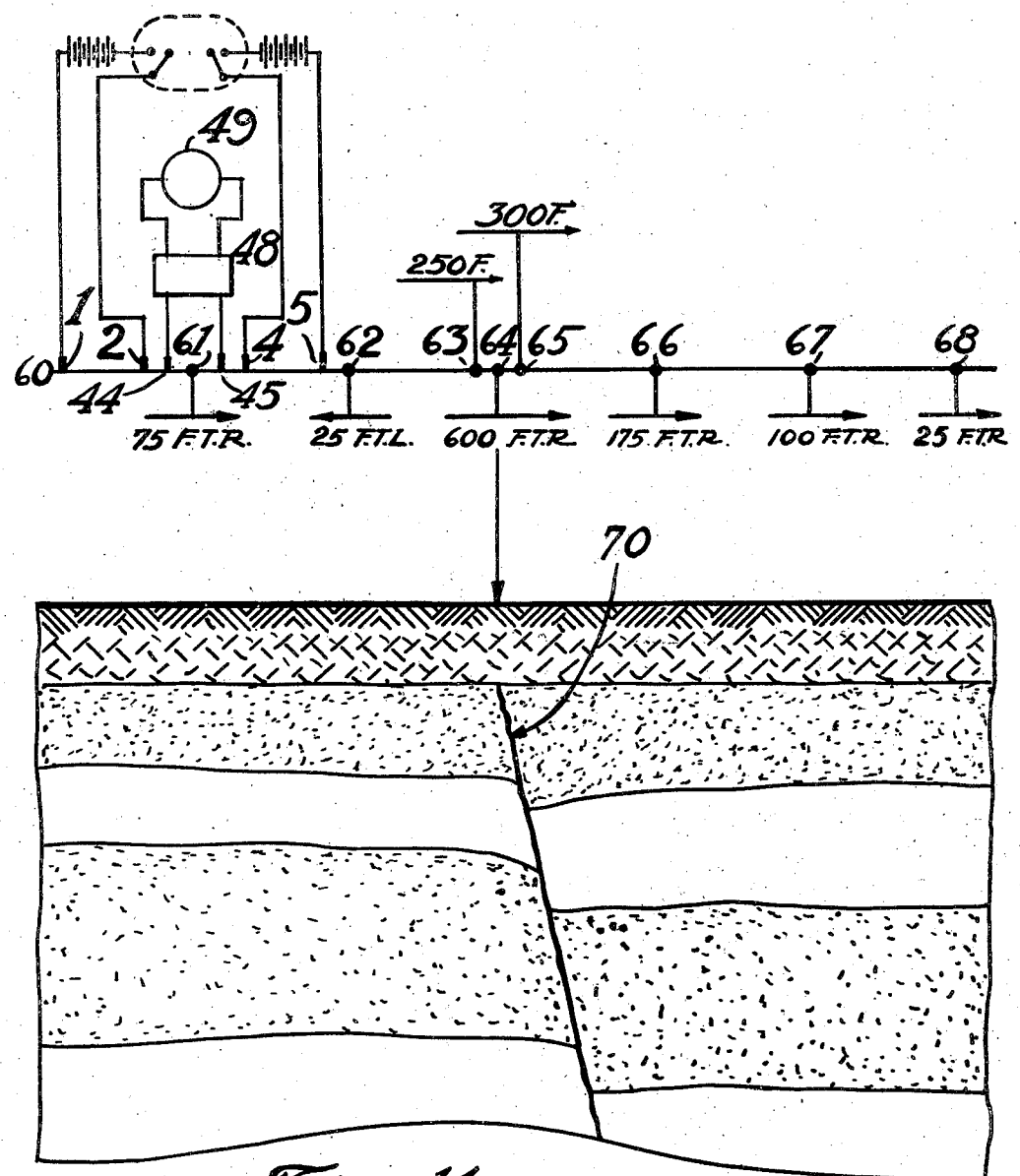
Fig. 14 is a vertical sectional view through the earth showing diagrammatically an arrangement of stations used which resulted in locating a fault.

As an example of the application which has been made of this invention in the field, I refer to Fig. 14 showing a line 60 which has been run over an area whose sub-surface geological conditions were unknown. On this line 60 were made successive instrument setups identical with those illustrated in Fig. 1 whose mid-points lay at 61, 62, 63, 64, 65, 66, 67, and 68. The arrow placed by each station represents the direction and distance which the potential electrodes had to be moved in order to obtain cancellation of the transients and this arrow points in the direction of greater effective conductivity. Referring to station 61, it was found that one of the potential electrodes had to be moved 75 feet in the direction indicated in order to obtain complete cancellation of the transients, showing that the conductivity of the earth was increasing toward the right as viewed in Fig. 14. Station 62 was set up approximately 7000 feet from station 61. The same observation was taken at station 62 and it was found to be necessary to move a potential electrode 25 feet toward the left as viewed in Fig. 14 to obtain complete cancellation of the transients thereby indicating that the conductivity of the earth was increasing slightly toward the left. Another station was taken approximately 7000 feet from station 62 at 64 at which it was found to be necessary to move a potential electrode 600 feet toward the right as viewed in Fig. 14 thereby indicating that the conductivity of the earth was increasing very rapidly toward the right at that point. Another station 66 was taken approximately 7000 feet from station 64 at which it was found to be necessary to move a potential stake 175 feet toward the right as viewed in Fig. 14 in order to obtain a complete cancellation of the transients thereby indicating that the conductivity of the earth was continuing to increase toward the right at that point. Another station 67 was taken approximately 6000 feet from station 66 at which it was found necessary to move a potential stake 100 feet toward the right as viewed in Fig. 14 thereby indicating that the conductivity of the earth was still increasing toward the right at that point. Another station 68 was taken approximately 7000 feet from station 67 at which it was found necessary to move a potential stake 25 feet toward the right as viewed in Fig. 14 thereby indicating that the conductivity of the earth was increasing very slightly toward the right at that point. Upon observation of the results obtained at each of these stations, it was noted that the amount of change of conductivity toward the right had been a maximum at station 64 and had decreased gradually at stations 66, 67 and 68 thereby suggesting the possibility of existence of a fault near station 64 and a gradual up-lift extending as far as station 67. Station 63 was then taken approximately 1000 feet to the left of station 64 as viewed in Fig. 14 at which it was found necessary to move a potential stake 250 feet toward the right in order to obtain complete cancellation of the transients, thereby indicating that the conductivity of the earth was increasing toward the right. Station 65 was taken approximately 1000 feet to the right of station 64 as viewed in Fig. 14 and it was found necessary to move a potential stake 300 feet toward the right in order to obtain complete cancellation of the transient, thereby indicating that the conductivity of the earth was still increasing greatly toward the right. The largest anomaly then seemed to be localized in the neighborhood of station 64 and in order to confirm our interpretation, shallow core wells were drilled at several points between stations 62 and 66 disclosing the presence of a fault lying approximately below station 64 and dipping to the right as viewed in Fig. 14 as shown at 70. These core wells were drilled to a depth of 250 feet at which depth the fault was in evidence with a throw of 20 feet.

Figure 3:
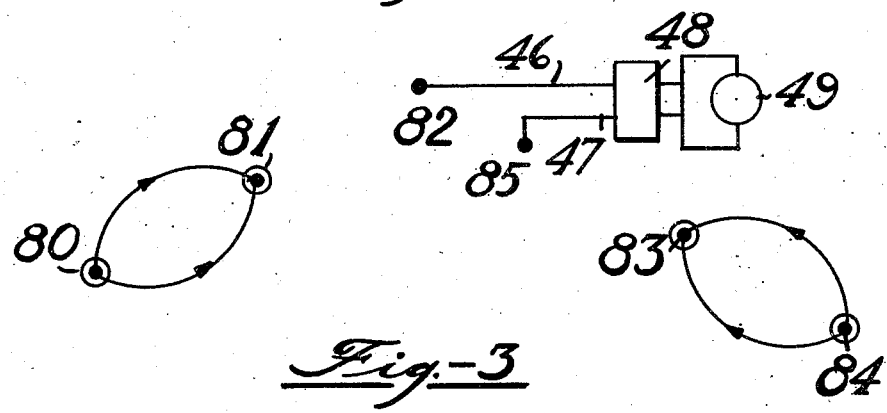
Fig. 3 is a top plan view showing a modified form of arrangement of the electrodes.

Referring to Fig. 3, a modified arrangement of the electrode is illustrated in top plan view with current electrodes 80 and 81 on a straight line with their corresponding potential electrode 82, and current electrodes 83 and 84 lying in approximately the same straight line with their corresponding potential electrode 85. It is noted that it is not necessary to have the two halves of the setup lying in the same straight line.

Figure 4:
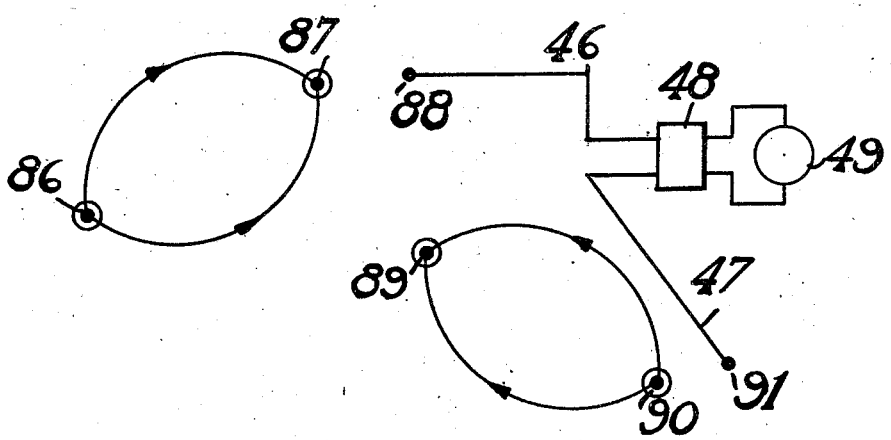
Fig. 4 is a top plan view showing still another modified arrangement of the electrodes.

Referring to Fig. 4 a still further modified arrangement is shown in top plan view comprising current electrodes 86 and 87 with their corresponding potential electrode 88, and current electrodes 89 and 90 with their corresponding potential electrode 91. The two halves of the setup are located in widely different neighborhoods. The apparatus illustrated in Figs. 3 and 4 is used in exactly the same manner as the apparatus in Fig. 1.

Fig. 6 illustrates the application of the method in its use along a roadway which may or may not be straight, and like reference numerals have been applied to like parts as in Figs. 1 and 2.

Figure 10:
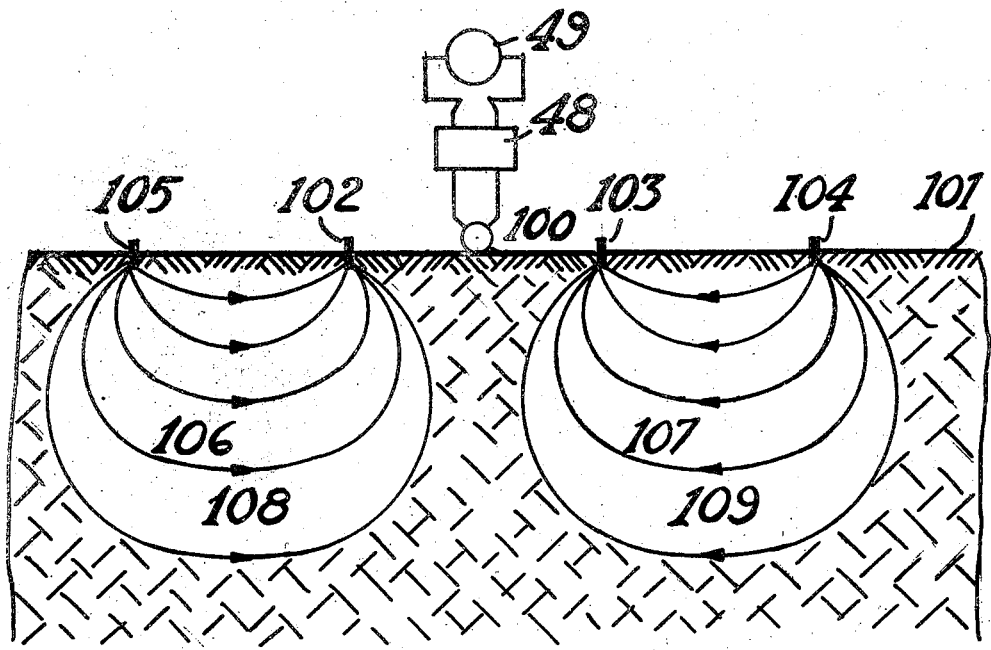
Fig. 10 is a vertical sectional view through the earth showing a coil for receiving the transient by induction.

Instead of the arrangement illustrated in Fig. 1 for receiving the transient by conduction, an arrangement is illustrated in Fig. 10 for receiving the transient by induction. The apparatus in Fig. 10 comprises an inductance coil 100 which may be a loop or solenoid whose axis lies parallel to the surface of the ground 101 and perpendicular to the line between current electrodes 102 and 103. If it is necessary to dispose current electrodes 103 and 104, and 102 and 105 in a configuration such as is illustrated in Fig. 4, then two inductance coils may be employed, using one for each setup of current electrodes and connecting the two inductance coils in series, the axis of each inductance coil lying parallel to the ground and perpendicular to the line drawn through the corresponding current electrodes.

Figure 11:
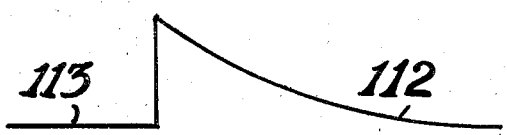
Fig. 11 is a record showing the potential induced in the coil due to the current between the first set of electrodes.
Figure 13:
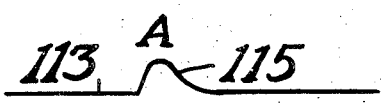
Fig. 13 is a record showing the sum of the two induced potentials.
Figure 12:
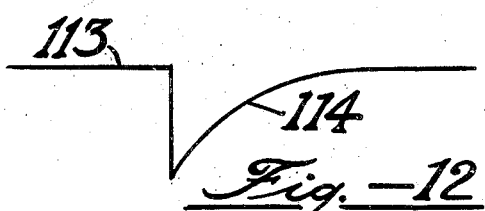
Fig. 12 is a record showing the potential induced in the coil due to the current in the second set of electrodes.

The transients now involved are illustrated in Figs. 11, 12, and 13. Referring to Fig. 11, the curve designated 112 represents with respect to a base line 113 the transient induced in the inductance coil 100 by the current 106. In Fig. 12, curve 114 represents with respect to the base line the transient induced in the inductance coil 100 by the current 107. Fig. 13 represents by curve 115 the sum of the two transients. The two transients are made to be initially equal in amplitude and opposite in phase, as clearly shown in Figs. 11 and 12, due to the opposition of the currents 106 and 107 as shown by the current direction arrows 108 and 109. The transient represented by Fig. 12 is assumed to fall more rapidly than that represented by Fig. 11, and the sum of the two transients as shown in Fig. 13 represents the transient induced into the inductance coil 100 by the application of both currents 106 and 107 simultaneously. Referring to Figs. 11 and 12 it is the graphical sum of these transients. The transient as shown in Fig. 13 lies above the line 113 at A due to the fact that the rate of decrease of the transient as shown in Fig. 12 is greater than that of the transient as shown in Fig. 11. We then move the inductance coil 100 closer to 102 thereby increasing the rate of decrease of the transient as represented by Fig. 11 and decreasing the rate of decrease of the transient as shown in Fig. 12. The initial amplitudes of the two transients are then again adjusted to be equal and opposite by suitable rheostats and another observation is made. When the position of the inductance coil 100 has been so adjusted that the transients as represented in Figs. 11 and 12 are equal and opposite, the record on the oscillograph screen will appear as a straight line. The distances from 100 to 102 and 100 to 103 should then be carefully measured, and from these data the relative effective conductivities of the earth below each half of the setup may be computed as before.

Figure 5:
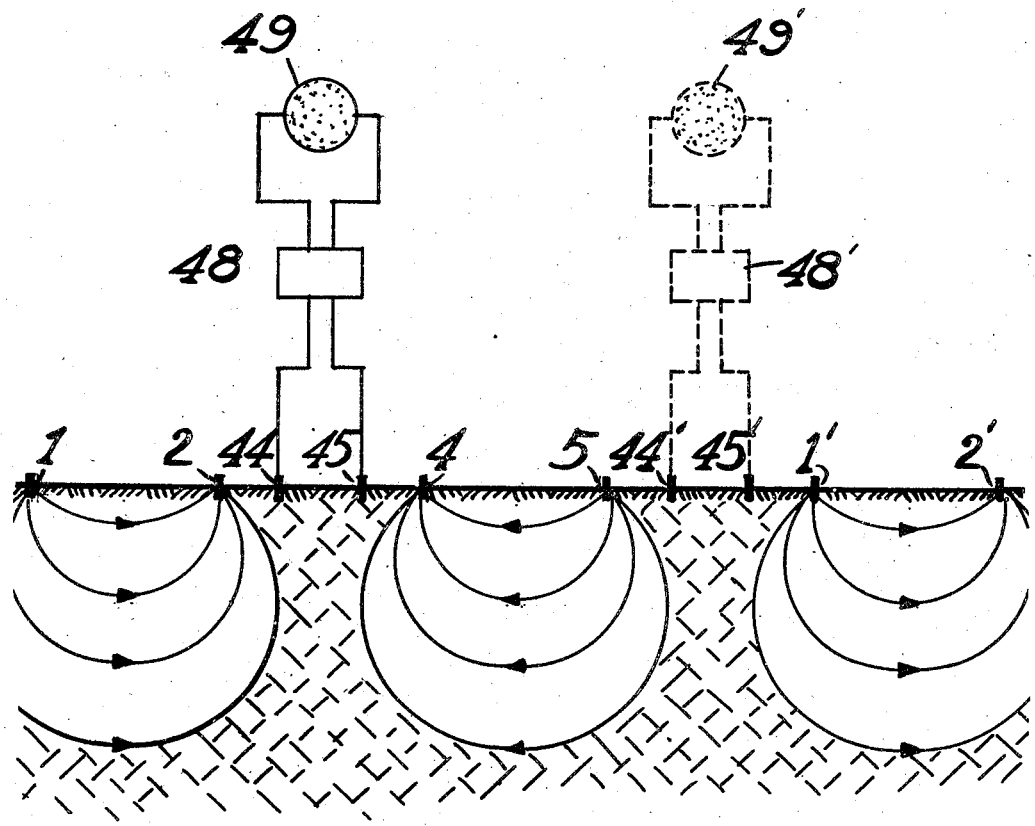
Fig. 5 is a vertical sectional view through the earth showing an arrangement for tying together the results obtained over an area.

Referring to Fig. 5, an example of field procedure is shown in which 1, 2, 4, and 5 are current electrodes and 44 and 45 are potential electrodes; the distances between electrodes may be as previously described in Fig. 1. After a reading has been made with this setup the current electrodes 1 and 2 may be moved to 1' and 2' and the potential electrodes 44 and 45 moved to 44' and 45' leaving the current electrodes 4 and 5 in their initial position. The reading which may now be taken furnishes a comparison of the electrical properties of the earth beneath electrodes 1 and 2 with those beneath electrodes 1' and 2' and by continuing this procedure continuous comparisons can be made over long distances.

By the invention described an accurate comparison of the transient at one station with the transient at another station is obtained without the necessity of making time measurements. Furthermore, it is not necessary to record photographically at all. If a cathode ray oscillograph with a phosphorescent screen is used, the traces are visible on the screen for a sufficiently long time for the operator to ascertain which way one of the stakes 44 and 45 must be moved to obtain a balance. Ground can be covered rapidly; thus in actual practice the distance from electrode 1 to 2 and from 4 to 5 may be one mile, distances 2 to 44 and 45 to 4 may be about 500 feet and the distance from 44 to 45 may be about 1000 feet. Then, as illustrated in Fig. 5, current stakes 1 and 2 are moved to new positions 1' and 2' and potential stakes 44 and 45 are moved to 44' and 45'. It is evident, then, that in the first setup the effective conductivity of the ground below electrodes 1 and 2 is compared with the effective conductivity of the ground below electrodes 4 and 5. In the second setup the effective conductivity of the ground below electrodes 4 and 5 is compared with the effective conductivity of the ground below electrodes 1' and 2'; thus one obtains a comparison of the effective conductivities from one setup to the next and covers upward of one mile per setup with the distances commonly employed.

While the invention has been described as applied to the surface of the earth it will be understood that it can be carried out in water, under water, along the sides of cliffs or other vertical structures, in bore holes, or in mines. Also, it can be applied to the determination of the electrical properties of other materials such as metals, semi-conductors and insulators.

Various changes and alternative arrangements may be made within the scope of the appended claims, in which it is my intention to claim the novelty inherent in the invention as broadly as the prior art permits.

I claim:

1. The method for the determination of geological structures, which comprises passing an electric current through the earth between at least two pairs of spaced electrodes, simultaneously altering the electric current through the earth between each pair of electrodes whereby a transient is obtained for each set of electrodes, and substantially cancelling the transients against each other.

2. The method for the determination of geological structures, which comprises passing an electric current through the earth between at least two pairs of spaced electrodes, simultaneously altering the electric current through the ground between each pair of electrodes whereby a transient is obtained for each set of electrodes, simultaneously receiving the transients, and varying the position of the receiving means until the substantial cancellation of the transients is obtained.

3. The method for the determination of geological structures, which comprises passing an electric current through the earth between at least two pairs of spaced electrodes, simultaneously altering the electric current through the earth between each pair of electrodes whereby a transient is obtained for each set of electrodes, receiving the transients, and varying the relative positions of the receiving means and the electrodes whereby substantial cancellation of the transients is obtained.

4. The method for the determination of geological structures, which comprises disposing at least two pairs of spaced electrodes in the earth, simultaneously applying an electric current through the earth between each pair of electrodes whereby a transient is obtained for each pair of electrodes, receiving the transients, and adjusting the amplitude of the current for each pair of electrodes independently in order that the effect of the direct current components of the transients can be cancelled at the receiving means.

5. Apparatus for the determination of geological structures, which comprises at least two pairs of spaced electrodes in the earth, means for simultaneously applying an electric current through the earth between each pair of electrodes whereby a transient is obtained for each pair of electrodes, receiving means including an electric circuit connected to a pair of potential electrodes disposed in the earth between the pairs of electrodes for observing a predetermined combination of the transients.

6. Apparatus for the determination of geological structures, which comprises at least two pairs of spaced electrodes in the earth, means for simultaneously applying an electric current through the earth between each pair of electrodes whereby a transient is obtained for each pair of electrodes, receiving means including an electric circuit connected to an inductance coil disposed on the surface of the earth in spaced relation to the pairs of electrodes for observing a resultant of the several transients.

7. Apparatus for the determination of geological structures, which comprises at least two pairs of spaced electrodes disposed in the earth, means for simultaneously applying an electric current through the earth between each pair of electrodes whereby a transient is obtained for each pair of electrodes, receiving means comprising an electric circuit connected to spaced potential electrodes disposed in the earth between the pairs of electrodes, the relative positions of which are adapted to be varied until substantial cancellation of the effect of the transients upon the receiving means is obtained.

8. The method for the determination of electrical properties of matter which comprises initiating a difference in potential between each pair of at least two pairs of spaced electrodes in the matter whereby a transient is obtained for each pair of electrodes and observing a resultant of the several transients.

9. The method for the determination of subsurface earth formations which comprises simultaneously initiating a difference in potential between each pair of at least two pairs of spaced electrodes in the earth whereby a transient is set up in the earth between each pair of electrodes and observing a resultant of the several transients.

10. The method for the determination of earth substructures which comprises arranging at least two pairs of spaced electrodes in the earth, each pair of electrodes being part of a circuit including a source of electrical power and an adjustable resistance, impressing the same voltage across the several pairs of electrodes, adjusting the resistances in the several electrode circuits until a current of the same amplitude passes through the earth between each pair of electrodes, simultaneously initiating the same difference in potential between each of the several pairs of electrodes whereby a transient is set up in the earth between each pair of electrodes and observing a resultant of the several transients.

11. The method for the determination of earth substructures which comprises simultaneously initiating a difference in potential between each pair of at least two pairs of spaced electrodes in the earth whereby a transient is set up in the earth between each set of electrodes and substantially cancelling the transients against each other.

12. The method for the determination of earth substructures which comprises simultaneously initiating the same difference in potential between each pair of at least two pairs of spaced electrodes in the earth whereby a transient is set up in the earth between each pair of electrodes, simultaneously receiving the several transients, and varying the position of the receiving means until the substantial cancellation of the transients is obtained.

13. The method for determination of earth substructures which comprises arranging at least two pairs of spaced electrodes in alignment on the earth's surface, initiating a difference in potential between the electrodes of each pair whereby a transient is set up in the earth between each pair of electrodes and observing a resultant of the several transients.

14. The method for the determination of earth substructures which comprises arranging at least two pairs of electrodes in longitudinal alignment and in spaced relation on the earth's surface, arranging a receiver of earth currents between adjacent pairs of electrodes and in alignment therewith, simultaneously initiating the same difference in potential between the electrodes of each pair, said difference in potential being in opposite directions in adjacent pairs of electrodes whereby a transient is set up in the earth between the electrodes of each pair and the transients of adjacent pairs are in opposite directions, receiving the transients of adjacent pairs of electrodes in said receiving means and observing a resultant of said transients.

15. The method for the determination of earth substructures which comprises arranging at least two pairs of electrodes in longitudinal alignment and in spaced relation on the earth's surface, each pair of electrodes being part of a circuit including a source of electrical power and an adjustable resistance, arranging a receiver of earth currents between adjacent pairs of electrodes and in alignment therewith, impressing the same voltage across the several pairs of electrodes, adjusting the resistances in the several electrode circuits until a current of the same amplitude passes through the earth between each pair of electrodes, simultaneously initiating the same difference in potential between the electrodes of each pair, said difference in potential being in opposite directions in adjacent pairs of electrodes whereby a transient is set up in the earth between the electrodes of each pair and the transients of adjacent pairs are in opposite directions, receiving the transients of adjacent pairs of electrodes in said receiving means and observing a resultant of said transients.

16. Apparatus for the determination of geological structures comprising at least two pairs of spaced electrodes in the earth, means for simultaneously initiating a difference in potential between each pair of electrodes whereby a transient is set up in the earth between the electrodes of each pair and means capable of recording a resultant of the several transients arranged in spaced relation to the pairs of electrodes.

17. Apparatus for the determination of earth substructures which comprises at least two pairs of spaced electrodes in the earth, means for simultaneously applying an electric current through the earth between each pair of electrodes whereby a transient is obtained for each pair of electrodes and receiving means including an electric circuit connected to a pair of potential electrodes disposed in the earth in spaced relation to the pairs of electrodes for observing a resultant of the several transients.

18. Apparatus for the determination of earth substructures comprising at least two pairs of spaced electrodes in the earth, each pair of electrodes being a part of an independent electrical circuit including a source of electrical power, a variable resistance in each of said circuits whereby with the same voltage on each pair of electrodes the earth currents between the several pairs of electrodes can be adjusted to the same amplitude, means for simultaneously initiating the same difference in potential between each pair of electrodes whereby a transient is set up in the earth between each pair of electrodes and means arranged in spaced relation to the several pairs of electrodes for observing a resultant of the several transients.

19. Apparatus for the determination of earth substructures comprising a plurality of longitudinally aligned pairs of electrodes in spaced relation to each other, means for simultaneously initiating a difference in potential between each pair of electrodes whereby a transient is set up in the earth between each pair of electrodes and means disposed between adjacent pairs of electrodes and in longitudinal alignment therewith for receiving a resultant of the transient of said adjacent pairs of electrodes.

20. An electric circuit for simultaneously applying a difference in potential between each pair of two pairs of electrodes comprising a pair of vacuum tubes, the plate and filament of one tube being connected in the circuit of one pair of electrodes and the plate and filament of the other vacuum tube being connected in the circuit of the other electrode and the grids of the two tubes being connected to each other through a resistance, means connecting the resistance to each of said circuits through a battery and a by-pass line including a switch connecting said resistance to said circuits in such a manner that when the switch is closed the battery is cut out of the circuit.

LOUIS STATHAM.